United States Patent [19]

Mendres

[11] Patent Number: 4,708,399
[45] Date of Patent: Nov. 24, 1987

[54] FLOATING RESILIENT SKELETAL CHAMELEON-LIKE AUDIBLE HELIX FOR BICYCLE

[76] Inventor: Donald N. Mendres, P.O. Box 6321, Scottsdale, Ariz. 85261

[21] Appl. No.: 23,256

[22] Filed: Mar. 9, 1987

[51] Int. Cl.⁴ .............................................. B60B 7/00
[52] U.S. Cl. ................................. 301/37 SA; 350/99
[58] Field of Search ................ 280/289 R; 301/37 R, 301/37 SA; 350/99

[56] References Cited

U.S. PATENT DOCUMENTS

| | | | |
|---|---|---|---|
| 2,621,081 | 12/1952 | Mann | 301/37 SA |
| 3,612,612 | 10/1971 | Gannon | 301/37 SA |
| 3,796,370 | 3/1974 | Speers et al. | 301/37 SA |
| 3,796,465 | 3/1974 | Cordiak | 301/37 SA |
| 4,285,573 | 8/1981 | Stone | 301/37 SA |
| 4,293,189 | 10/1981 | Morikawa | 301/37 SA |

FOREIGN PATENT DOCUMENTS 527981  6/1955  Italy ....................... 350/99

Primary Examiner—John A. Pekar
Attorney, Agent, or Firm—Nissle & Leeds

[57] ABSTRACT

Visually distinctive, chameleon-like, floating, skeletal apparatus for the spoke of a bicycle. The apparatus enables a bystander to readily visually and audible sense the presence of a bicycle, alters its shape and dimension and position on the bicycle during operation of the bicycle, and comprises a material having portions with differing indices of refraction.

16 Claims, 4 Drawing Figures

U.S. Patent   Nov. 24, 1987   4,708,399
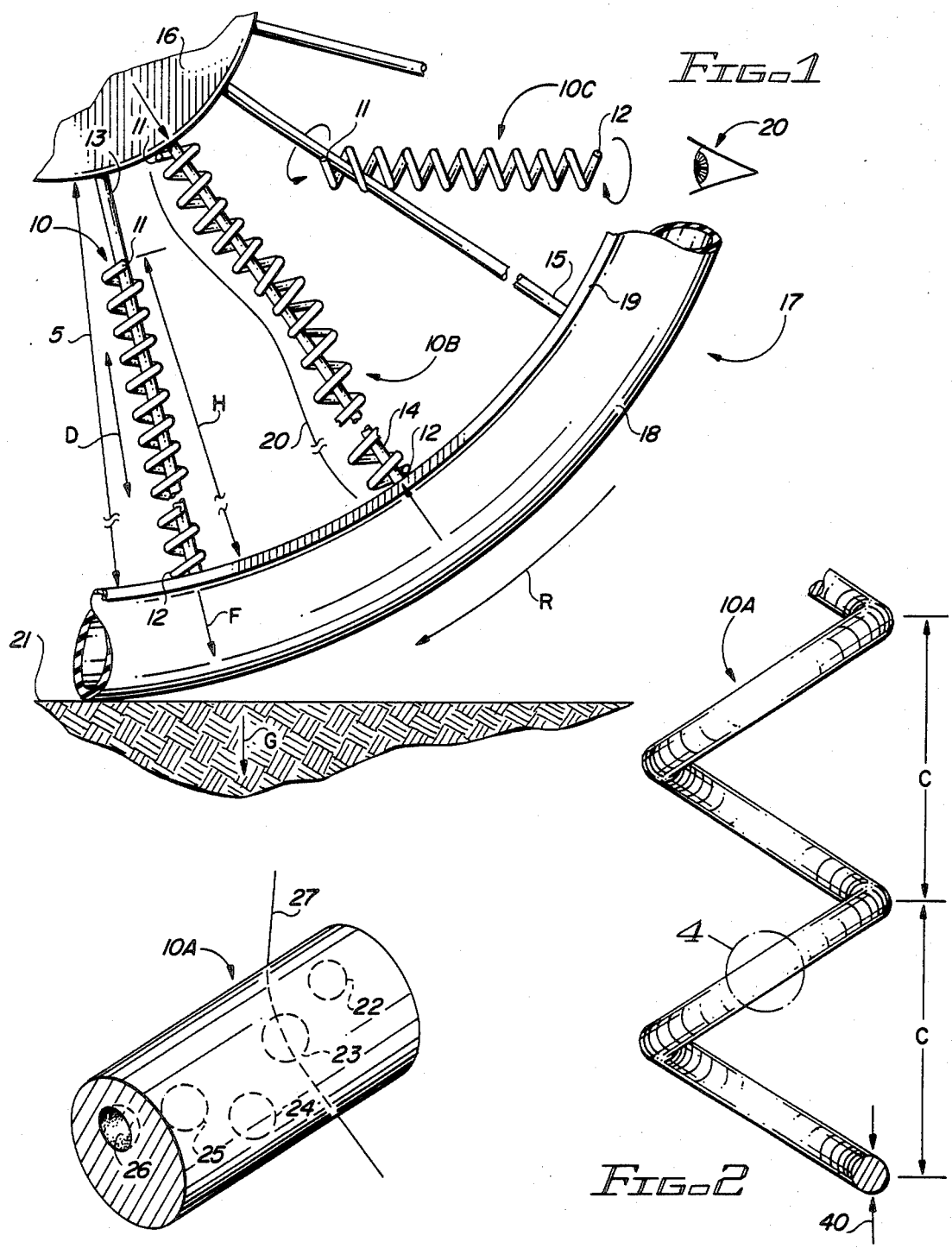

FLOATING RESILIENT SKELETAL CHAMELEON-LIKE AUDIBLE HELIX FOR BICYCLE

This invention relates to apparatus for improving the visibility of vehicles and for improving the manual dexterity and hand-eye coordination of an individual.

More particularly, the invention relates to visually distinctive, chameleon-like, floating, skeletal apparatus for a bicycle, the apparatus being illuminated by light which travels to the apparatus from any point on a compass, the illuminated apparatus being visible to an individual positioned to either side, forward, or rearward of the bicycle.

In a further respect, the invention relates to floating, chameleon-like, skeletal apparatus which enables a bystander to readily visually and audibly sense the presence of a nearby bicycle, the apparatus altering its shape and dimension and position on the bicycle during operation of the bicycle, and being comprised of material having differing indices of refraction.

In still another respect, the invention pertains to bicycle apparatus of the type described which, under differing light conditions, produces different visually discernible color hues.

In yet another respect, the invention pertains to bicycle apparatus of the type described which diffracts light into its spectral components.

In yet still a further respect, the invention relates to skeletal apparatus of the type described which is installed on a bicycle without the use of conventional hand tools and which, during installation, exercises the hand-eye coordination of the user.

Each year, bicyclists are involved in numerous accidents which occur because the driver of an automobile or other vehicle did not see the bicyclists in time to avoid the accidents. It would, accordingly, be highly desirable to provide improved apparatus for bicycles which would enable the driver of a vehicle to more readily visually sense the presence of a nearby bicycle. It would also be highly desirable to provide improved bicycle apparatus which, in addition to being visually distinctive, could be installed on existing bicycles without requiring the use of conventional hand tools and which would, when the apparatus was being installed, exercise the manual dexterity and hand-eye coordination of an individual.

Therefore, it is a principal object of the invention to provide improved bicycle apparatus for enabling a bystander to readily visually sense the presence of a nearby bicycle.

Another object of the invention is to provide improved apparatus which can be readily installed on existing bicycles without requiring the use of conventional hand tools, and which, during the installation procedure, requires an individual to exercise his hand-eye coordination.

A further object of the invention is to provide improved bicycle apparatus which alters its shape and dimension and position on the bicycle during operation of the bicycle, which produces a variety of visually discernible color hues under varying light conditions, and which diffracts light into its spectral components.

Still another object of the instant invention is to provide improved bicycle apparatus of the type described which has a skeletal appearance that accentuates characteristic features of a bicycle.

There and other, further and more specific objects and advantages of the invention will be apparent to those skilled in the art from the following detailed description thereof, taken in conjunction with the invention drawings, in which:

FIG. 1 is a partial front view illustrating a bicycle wheel equipped with apparatus constructed in accordance with the principles of the invention;

FIG. 2 is a partial front view illustrating the apparatus of the invention;

FIG. 3 is a top view illustrating the apparatus of FIG. 2; and,

FIG. 4 is a perspective view further illustrating the interior construction of a segment of the apparatus of FIG. 2.

Briefly, in accordance with my invention, I provide a cycle including a frame; and, at least one ground engaging wheel rotatably mounted on the frame. The wheel includes a hub; annular rim means spaced apart from the hub and including a circular ground engaging tread means; a plurality of radially extending skeletal spokes spanning the distance between and interconnecting the hub and rim means; and, helical resilient light diffracting spring means circumscribing at least one of the spokes, having first and second ends, and slidably mounted on the spoke for movement between at least first and second operative positions during use of the cycle. In the first operative position the first end contacts the rim means and the spring means is compressed against the rim means by at least one of the force of gravity and centrifugal force generated during rotation of the wheel. In the second operative position the second end of the spring means is forced against the hub by the force of gravity. The unstressed length of the spring means is less than the length of the spoke. The spring means can be luminescent or fluorescent and can be comprised of a material which refractively passes light and includes light diffracting entrained bubbles, the bubbles having an index of refraction different than the index of refraction of the material.

In another embodiment of my invention, I provide an improved cycle including a frame; and, at least one ground engaging wheel rotatably mounted on the frame. The wheel includes a hub; annlar rim means spaced apart from the hub and including circular ground engaging tread means; a plurality of radially extending skeletal spokes each having an outer diameter and spanning the distance between and interconnecting the hub and rim means; and, helical resilient light diffracting skeletal spring means circumscribing at least one of the spokes, having first and second ends and a minor inner diameter greater than the diameter of the spoke, and being compressed between the hub and rim means in an elongate undulating orientation. The first end of the spring means contacts the hub. The second end of the spring means contacts the rim means. The spring means can be luminescent or fluorescent or comprised of a material which refractively passes light and includes light diffracting entrained bubbles, the bubbles having an index of refraction different than the index of refraction of the material.

In still another embodiment of my invention, I provide an improved method of equipping a cycle with apparatus to enhance the visibility of the cycle. The cycle includes a frame; and, at least one ground engaging wheel rotatably mounted on the frame. The wheel includes a hub; annular rim means spaced apart from the hub and including circular ground engaging tread means; and, a plurality of radially extending spokes spanning the distance between the interconnecting the hub and rim means. The improved method includes the steps of manufacturing a helical resilient light diffracting spring having first and second ends and a minor inner diameter greater than the diameter of the spokes; placing one of the first and second ends of the spring adjacent one of the spokes; and, manually rotating the spring to turn the one of the first and second ends about the spoke and turn the spring onto the spoke. The unstressed length of the spring can be less than the length of the spoke. The spring can be luminescent or fluorescent and comprised of a material which refractively passes light and includes light diffracting entrained bubbles, the bubbles having an index of refraction difference than the index of refraction of the material. The length of the spring can be greater than the length of the spoke. The minor inner diameter of the resilient spring can be less than the diameter of the spoke.

Turning now to the drawings, which depict the presently preferred embodiments and best mode of the invention for the purpose of illustrating the practice thereof and not by way of limination of the scope of the invention and in which like reference characters represent corresponding elements throughout the several views, FIGS. 1-4 illustrate apparatus constructed in accordance with the principles of the invention and generally identified by reference characters 10A-10C. Each helical, resilient spring 10A-10C includes a first end 12 and a second end 11. The minor inner diameter of each helical spring 10A-10C is indicated by arrows I in FIG. 3, while the outer diameter is indicated by arrows O. While the inner and outer diameter of each coil of springs 10A-10C is equal to that of other coils in the springs, springs 10A-10C could comprise coils having different inner diameters, in which case the diameter of the coil having the smallest inner diameter would be termed the minor inner diameter, and the diameter of the spring coil having the largest inner diameter would be termed the major inner diameter. In FIG. 3 the minor inner diameter and major inner diameter of each coil in spring 10A are equal. In FIG. 2 the length of a coil of spring 10A is indicated by arrows C. As indicated in FIG. 1, springs 10A has unstressed length indicated by arrows H and is slidably mounted on spoke 13 for movement therealong in the opposing directions indicated by arrows D. When spring 10A is subjected to tensile or compressive forces of sufficient magnitude, the length of spring 10A becomes greater or less than, respectively, its unstressed length. Spokes 13, 14 and 15 span the distance between and interconnect wheel hub 16 and rim means 17. Annular metal rim 19 and rubber circular ground engaging tread 18 comprise rim means 17. While not shown in the drawings, the wheel including hub 16 and rim means 17 is rotatably carried on the frame of a unicycle, bicycle, tricycle, motor cycle or some other vehicle in conventional fashion.

Helical springs are mounted on each of the spokes comprising the spoke skeleton of the wheel in the manner indicated for helical spring 10C in FIG. 1. To install a spring 10C on a spoke 15, an end 11 is placed adjacent a spoke 15 and spring 10C is rotated to turn end 11 around spoke 15. From the line of sight indicated by eye 20 in FIG. 1, spring 10C is turned in a clockwise direction to thread spring 10C onto spoke 15. Springs 10A and 10B illustrate the position of a helical spring after it has been completely manually rotated on the spoke of a wheel.

Since spring 10A has a length H which is shorter than the length S of spoke 13, and since the minor inner diameter of spring 10A is greater than the outer diameter of spoke 13, spring 10A "floats" on spoke 13 and can be readily slidably displaced along spoke 13 in the directions indicated by arrows D. The wheel in FIG. 1 is resting on ground 21, and the force of gravity G pulls spring 10A against rim 19 such that end 12 contacts rim 19. When the wheel of FIG. 1 rotates in the direction of arrow R while traveling over ground 21, spoke 13 will move to a position in which is extends upwardly away from hub 16 and ground 21. When spoke 13 is in this upwardly extending position, the force of gravity will tend to pull helical spring 10A down along spoke 13 toward hub 16 such that end 11 contacts hub 16, and if the rotation of the wheel is stopped with the spoke generally vertically extending upwardly away from hub 16 and ground 21, spring 10 will move along spoke 13 such that end 11 comes to rest against hub 16. Springs 10A-10C are presently preferably fabricated from PVC plastic. Dyes are added to the plastic to produce springs of different colors. When springs 10A-10C are of sufficiently light weight, the rotation of the wheel can produce centrifugal forces F sufficient to overcome the weight of springs 10A-10C and to overcome the frictional resistance between a spoke and springs 10A to force spring 10A outwardly against rim 19 even when spoke 13 extends vertically upwardly away from hub 16 and from the ground. The centinual floating, or movement, of spring 10A on spoke 13 during operation of a bicycle and rotation of the wheel of FIG. 1 causes an observer to more readily visually sense the presnce of the bicycle.

Helical spring 10A-10C are skeletal in appearance. When the springs 10A-10C are mounted on the spoke skeleton supporting rim means 17, the skeletal appearance of the springs accentuates the spoke skeleton and produces a novel visual appearance which is readily recognized by an individual standing to either side, in front or behind of the wheel and the cycle frame carrying the wheel.

The length of spring 10B is greater than the length of spoke 14. Consequently, when, as illustrated in FIG. 1, spring 10B is mounted on spoke 14, it is compressed between hub 16 and rim 19. Since the minor inner diameter of spring 10B is greater than the diameter of spoke 14, spring 10B typically takes on the undulating orientation illustrated in FIG. 1. This undulating orientation is further indicated by line 20. Line 20 has, for the sake of clarity, been moved to one side of spring 10B; however, line 20 can be thought of as passing through the centerpoint of each coil in spring 10B. The centerpoint 21 of a coil is shown in FIG. 3 in connection with coil 10A.

The enlarged segment of a coil of spring 10A illustrated in FIG. 4 displays the entrained bubbles 22-26 formed in spring 10A. Resilient spring 10A is, as earlier noted, preferably formed from a lightweight polyvinylchloride (PVC) plastic material. While springs 10A-10C can be opaque, it is preferred that they be translucent or transparent. Entrained bubbles 22-26 normally comprise air or another gas.

Light entering the segment of spring 10A shown in FIG. 4 is indicated by arrow 27. Light 27 is initially refracted by the PVC or other material comprising spring 10A and then is again refracting on passing into and out of entrained gas bubble 23. If an object of sufficiently small dimensions is placed in the path of light rays, it does not cast a sharply outlined geometrical shadow (as would correspond to rectilinear propogation of light). Instead, a certain arrangement of light and dark areas is observed. Such deviation from the rectilinear path is called diffraction. The phenomenon of diffraction is explained in terms of the wave theory of light and the superposition of individual light waves (interferences). The small annular haloes, or coronas, which sometimes appear round the sun and moon are diffraction phenomena caused by tiny water droplets in the upper atmosphere. For this reason the outer edge of such a halo displays a faint red color. On the other hand, large haloes are phenomena due to refraction and reflection of light by ice crystals. The color sequence in such haloes, if it is perceptible at all, is the reverse of that in small haloes, i.e., red is on the inside and violet on the outside of the ring. Since the diameter 40 (FIG. 2) of the cyclindrical spiral strand comprising helix 10A is presently preferably about 1/16 inch, spring 10A and the bubbles entrained therein diffract light contacting spring 10A.

When helical spring 10A moves along spoke 13 and contacts hub 16 and rim 19 it produces distinctive sounds which facilitate a bystander's audibly sensing the presence of the bicycle on which spring 10A is mounted. The sounds produced will vary depending on the materials utilized to construct spring 10A, spoke 13, hub 16 and rim 19. When spring 10A is made from PVC and spoke 13, hub 16 and rim 19 are made from metal, the sound produced is, in some respects, similar to the sound produced by rusting leaves.

Springs 10A-10C can reflect light.

Having described my invention in such terms as to enable those skilled in the art to understand and practice it, and having identified the presently preferred embodiments thereof, I claim:

1. A cycle including
(a) a frame; and
(b) at least one ground engaging wheel rotatably mounted on said frame and including
  (i) a hub,
  (ii) annular rim means spaced apart from said hub and including circular ground engaging tread means,
  (iii) a plurality of radially extending skeletal spokes spanning the distance between and interconnecting said hub and rim means, and
  (iv) helical resilient light diffracting floating spring means circumscribing at least one of said spokes, having first and second ends, and slidably mounted on said skeletal spoke for movement between at least two positions during operation of said cycle,
    a first operative position with said first end contacting said rim means and said spring means compressed against said rim means by at least one of the force of gravity, and
      centrifugal force generated during rotation of said wheel, and
    a second operative position with said second end of said spring means forced against said hub by the force of gravity,
the unstressed length of said spring means being less than the length of said spoke.

2. The cycle of claim 1 wherein said spring means is luminescent.

3. The cycle of claim 1 wherein said spring means is fluorescent.

4. The cycle of claim 1 wherein said spring means is comprised of a material which refractively passes light and includes light diffracting entrained bubbles, said bubbles having an index of refraction different than the index of refraction of said material.

5. The cycle of claim 1 wherein said spring means, hub, spokes and rim means comprise materials which cause sound to be produced when said spring means moves between said first and second operative positions, said sound enabling a bystander to audibly sence the presence of said cycle.

6. A cycle including
(a) a frame; and
(b) at least one ground engaging wheel rotatably mounted on said frame and including
  (i) a hub;
  (ii) annular rim means spaced apart from said hub and including circular ground engaging tread means,
  (iii) a plurality of radially extending skeletal spokes each having an outer diameter and spanning the distance between and interconnecting said hub and rim means, and
  (iv) helical resilient light diffracting spring means circumscribing at least one of said spokes, having first and second ends and an inner diameter greater than said diameter of said spoke, and mounted on said one of said spokes compressed between said hub and said rim means in an elongate undulating orientation, said first end of said spring means contacting said hub and said second end contacting said rim means.

7. The cycle of claim 6 wherein said spring means is luminescent.

8. The cycle of claim 6 wherein said spring means is fluorescent.

9. The cycle of claim 6 wherein said spring means is comprised of a material which refractively passes light and includes light diffracting entrained bubbles, said bubbles having an index of refraction different than the index of refraction of said material.

10. A method of equipping a cycle with apparatus to enhance the visibility of the cycle, said cycle including a frame; and
at least one ground engaging wheel rotatably mounted on said frame and including,
  (i) a hub;
  (ii) annular rim means spaced apart from said hub and including circular ground engaging tread means,
  (iii) a plurality of radially extending skeletal spokes spanning the distance between and interconnecting said hub and rim means,
said method including the steps of
  (a) manufacturing a helical resilient light diffracting spring having first and second ends and an inner diameter greater than said diameter of said spokes; and
  (b) placing one of said first and second ends of said spring adjacent one of said spokes; and,
  (c) manually rotating said spring to turn said one of said first and second ends about said spoke and turn said spring onto said spoke.

11. The method of claim 10 wherein the unstressed length of said spring is less than the length of said spoke.

12. The method of claim 10 wherein said spring is luminescent.

13. The method of claim 10 wherein said spring is fluorescent.

14. The method of claim 10 wherein said spring is comprised of a material which refractively passes light and includes light diffracting entrained bubbles, said bubbles having an index of refraction different than the index of refraction of said material.

15. The method of claim 10 wherein the unstressed length of said spring is greater than the length of said spoke.

16. The method of claim 10 wherein the minor inner diameter of the resilient spring is less than the diameter of the spoke.

* * * * *